United States Patent
Hollander et al.

(10) Patent No.: US 6,301,699 B1
(45) Date of Patent: Oct. 9, 2001

(54) METHOD FOR DETECTING BUFFER OVERFLOW FOR COMPUTER SECURITY

(75) Inventors: Yona Hollander, Tel Aviv; Ophir Rahman, Ramat-Gan; Shmuel Sagiv, Tel Aviv; Ury Segal, Modi'n, all of (IL)

(73) Assignee: Corekt Security Systems, Inc., Boston, MA (US)

( * ) Notice: Subject to any disclaimer, the term of this patent is extended or adjusted under 35 U.S.C. 154(b) by 0 days.

(21) Appl. No.: 09/271,548

(22) Filed: Mar. 18, 1999

(51) Int. Cl.[7] ........................................ G06F 1/00

(52) U.S. Cl. ................ 717/4; 713/200; 709/100

(58) Field of Search ................ 717/4; 713/200; 709/100

(56) References Cited

U.S. PATENT DOCUMENTS 5,949,973 * 9/1999 Yarom .............................. 395/186

* cited by examiner

*Primary Examiner*—Mark R. Powell
*Assistant Examiner*—Todd Ingberg
(74) *Attorney, Agent, or Firm*—Holland & Knight LLP; John L. DeAngelis, Jr.; James H. Beusse

(57) ABSTRACT

Method for detecting buffer overflow weakness exploitation, including the steps of determining a plurality of threshold parameters, each respective to a buffer overflow weakness exploitation event, analyzing a code to be executed, thereby producing a plurality of validation values, comparing said validation values to the respective ones of the threshold parameters, and determining a buffer overflow weakness exploitation attempt, when at least one of the validation values exceeds the respective one of the threshold parameters.

7 Claims, 10 Drawing Sheets

METHOD FOR DETECTING BUFFER OVERFLOW FOR COMPUTER SECURITY

FIELD OF THE INVENTION

The present invention relates to a method for detecting unauthorized access attempts within a computer system, in general and to a method for detecting an attempt to exploit the buffer overflow-related weakness within a computer system, in particular.

BACKGROUND OF THE INVENTION

Computer systems, which provide services to a plurality of users, are known in the art. Such services are provided through enabling access to a variety of system resources.

It will be appreciated to those skilled in the art that such computer systems are often configured and administered so each user is granted access to predetermined and limited resources of the system. For example, one user can have supervisor authorization, thereby being able to access and control most or all of the resources of the system. Such a user is also called a super-user. Similarly, another user can have a low level of authorization, thereby enabling him to access a limited set of resources of the system.

Reference is now made to FIG. 1, which is a schematic illustration of a computer system and a plurality of user stations, connected thereto. Computer system 10 includes a communication device 12, a CPU 14, a memory 22 and a plurality of system resources such as storage unit 16, printer 18 and multi-media unit 20. CPU 14 is connected to communication device 12, storage unit 16, printer 18 and multi-media unit 20. System 10 is connected to external users via computer systems 30, 32 and 34, and via a network 24.

Each of external users accessing system 10 via computer systems 30, 32 and 34 is allocated a different level of authorization, with respect to system 10. The user using computer system 30 is predetermined as a super-user, thereby being able to access and control all of the resources of computer system 10. The user using computer system 32 is predetermined as a high-level user, thereby being able to access storage unit 16, printer 18 and multi-media unit 20. The user using computer system 34 is predetermined as a low-level user, thereby being able to access printer 18.

Operating systems, such as the Unix based Solaris operating system produced and manufactured by Sun Computers Incorporated, allow discretionary access control to computer system components. Such systems allow programmers to grant or revoke user access rights to objects within a computer system. Conventionally, objects within a computer system include files, directories, computer programs and the like.

While a computer program is running, the computer program may be required to access objects for which the user executing the program does not have necessary privileges. Conventionally, system 10 administrator can provide such computer programs with predetermined enhanced privileges. Thus enabling non privileged user to access a privileged computer system resource in a controlled manner.

When a computer program is executed a computer program process is created. Conventionally, a computer program process is the manner of execution of the computer program.

Computer system 10 is vulnerable to attack techniques attempting to exploit enhanced privileges (for example, gaining super user privileges) within the computer system 10 via the Network 24 and the communication device 12.

One such technique is known as induced buffer overflow and is known in the art. Buffer overflow can be exploited in order to gain super user privileges within a computer system. Gaining super user privileges within a computer system allows non-authorized users access to privileged resources.

Buffer overflow is caused when a computer system attempts to write past the end of a defined array. Arrays are predefined allocated memory devices within a computer system. A computer program process is allocated an array of user address space. User address space is a memory device wherein the computer program processes are executed.

Reference is now made to FIG. 2A, which is a schematic illustration of an array of user address space locations, generally referenced 50, known in the art.

A computer program comprises instructions. Such instructions are executed by the computer system. Functions are part of a computer program. Functions contain several computer program instructions. Functions exchange variables by means of parameter passing, implemented within the stack segment user address space. User address space is organized in three parts, text 52, data 56 and stack segments 54.

The stack segment 54, of the array of user address space 50, contains and handles local variables, which are used by a function. The stack segment 54 of the array of user address space 50 further passes parameters to and from functions.

Reference is now made to FIG. 2B, which is a schematic illustration in detail of the stack segment array 54 of the array of user address space in FIG. 2A, known in the art.

When a computer program process is started the system 10 dynamically allocates an available stack segment block 61 of the stack segment array 54 to the process. Such stack segment block is deallocated when the process is completed.

When a function is invoked within a process, a frame 62 is allocated to the computer program process. Frames include the information needed by a single execution of a function.

Such information includes the temporary values field 69 holding the evaluation of expressions and the local data field 68 holding data for the execution of the process. Such information further includes the return address field 67. The return address field 67 includes the return address for the calling function. Such return address is the next computer program instruction subsequent the function call. Other information includes the optional access link field 66 pointing to data held in other frames, the optional control link field 65 and the actual parameters field 64 holding the parameters to be passed to the calling program or function. Such a frame is deallocated when the function ends.

Reference is now made to FIG. 3, which is a schematic illustration of a function stack segment array, generally referenced 70, and of a computer program, generally referenced 80, which are known in the art.

In the present example, computer program 80 includes three program elements 82, 84 and 86, which are performed in sequence. Program elements 82 and 86 are general computer program instructions. Program element 84 is a function call. Accordingly, function call 84 is performed after computer instruction 82 and before computer instruction 86. When the function 84 is called, the flow control of the computer program 80 is altered. Typically, a function receives the computer program control, performs a predetermined task and returns the computer program control to the statement or instruction, which follows the function call.

System 10 automatically determines a function return address 72, for function 84 and stores it within the stack segment return address field 67 of the array of user address space 50 (FIGS. 2A and 2B). Function return address 72 indicates the location of the computer program instruction which follows function 84, which in the present example is instruction 86.

One known technique to compromise the integrity and security within a computer system is to pass, as a parameter, a string containing a computer program or other executable code into the function stack segment array 74. Such string is passed to the function stack segment array 74 by the function 84 and is stored within the stack segment frame actual parameters field 64 of the array of user address space 50 (FIGS. 2A and 2B). It is noted that the length of this sting exceeds the length of the destination field 64.

When passed, such string overwrites past the end of the allotted field 64 (FIG. 2B) for the function 84. By overwriting past the end of the stack segment function actual parameters field 64 (FIG. 2B), the string further replaces the stack segment function return address 72 stored at the return address field 67 (FIG. 2B) with the stack segment function array initial address 76 (first address of the actual parameters field 64 of FIG. 2B).

Stack segment 76 points to the content of the function stack segment 74 actual parameters field 64 (FIG. 2B) as the next program instruction, which has to be executed after function 84.

It will be appreciated by those skilled in the art that the content of the function stack segment 74 can contain a valid computer instruction, capable of performing any predetermined operation, such as granting access to any resource within system 10.

Conventionally, if the set of privileges granted to the function 84 by the computer system administrator are enhanced privileges, then such privileges are granted to the computer program residing within the function stack segment array 74. Users executing function 84 and through the computer program residing within the function stack segment can receive such enhanced privileges, also known as super user privileges or root privileges.

Several strategies, which attempt to resolve this problem, are known in the art. These strategies are described by D. Bruschi et. al in "A Tool for Pro-active Defense Against the Buffer Overrun Attack" Published in Lecture Notes in Computer Science, 1485 Proceedings of the $5^{th}$ European Symposium on Research in Computer Security Louvain-la-Neuve, Belgium, September 1998.

One such strategy is to design a computer program compiler designed to prohibit a computer program from writing past a stack segment array. Another such strategy is to detect off line buffer overflow vulnerable programs and alert the user to the possibility that the system privileges may be compromised.

Additional known strategy is to repair a program, which can be used to exploit the buffer overflow weakness, by providing a program for repairing and fixing such vulnerable program.

Non of the above provide an effective method for detection of buffer overflow within a computer system.

SUMMARY OF THE PRESENT INVENTION

It is an object of the present invention to provide a novel method for detecting and preventing a buffer overflow within a computer system, which overcomes the disadvantages of the prior art.

In accordance with the present invention, there is thus provided a method for detecting buffer overflow weakness exploitation, including the steps of determining a at least one threshold parameter, where each of the threshold parameters is respective to a buffer overflow weakness exploitation event, analyzing a code to be executed, thereby producing at least one validation value, comparing the validation values to the respective ones of the threshold parameters, and determining a buffer overflow weakness exploitation attempt, when at least one of the at least one validation value exceeds the respective one of the at least one threshold parameters.

In accordance with one aspect of the invention, the step of analyzing can include the steps of scanning the code thereby detecting jump instructions and target addresses, associating the jump instructions with the target addresses, determining jump instructions which are not associated with any of the target addresses as invalid jump instructions, and determining one of the validation value as a function of the number of the invalid jump instructions.

In accordance with another aspect of the invention, the step of analyzing includes the steps of sequentially analyzing the instructions of the code, determining the first instruction of the code as the beginning of a first block, determining each detected jump instruction as an end of a block, determining an instruction which follows each of the detected jump instructions as a beginning of a block, determining the jump address of each of the detected jump instructions as a beginning of a block, determining an instruction which precedes each detected jump target address as an end of a block, determining the last instruction of the code as the end of a last block, detecting a system call instruction between each of the beginning of a block and the first following end of a block, and determining one of the validation values as a function of the number of detected system call instructions and the number of the beginnings of a block.

The method can further include the step of producing an alert when determining the buffer overflow weakness exploitation attempt.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention overcomes the disadvantages of the prior art by providing a novel method, which detects if an attempt to exploit the buffer over flow weakness is occurring.

Figure 4A:
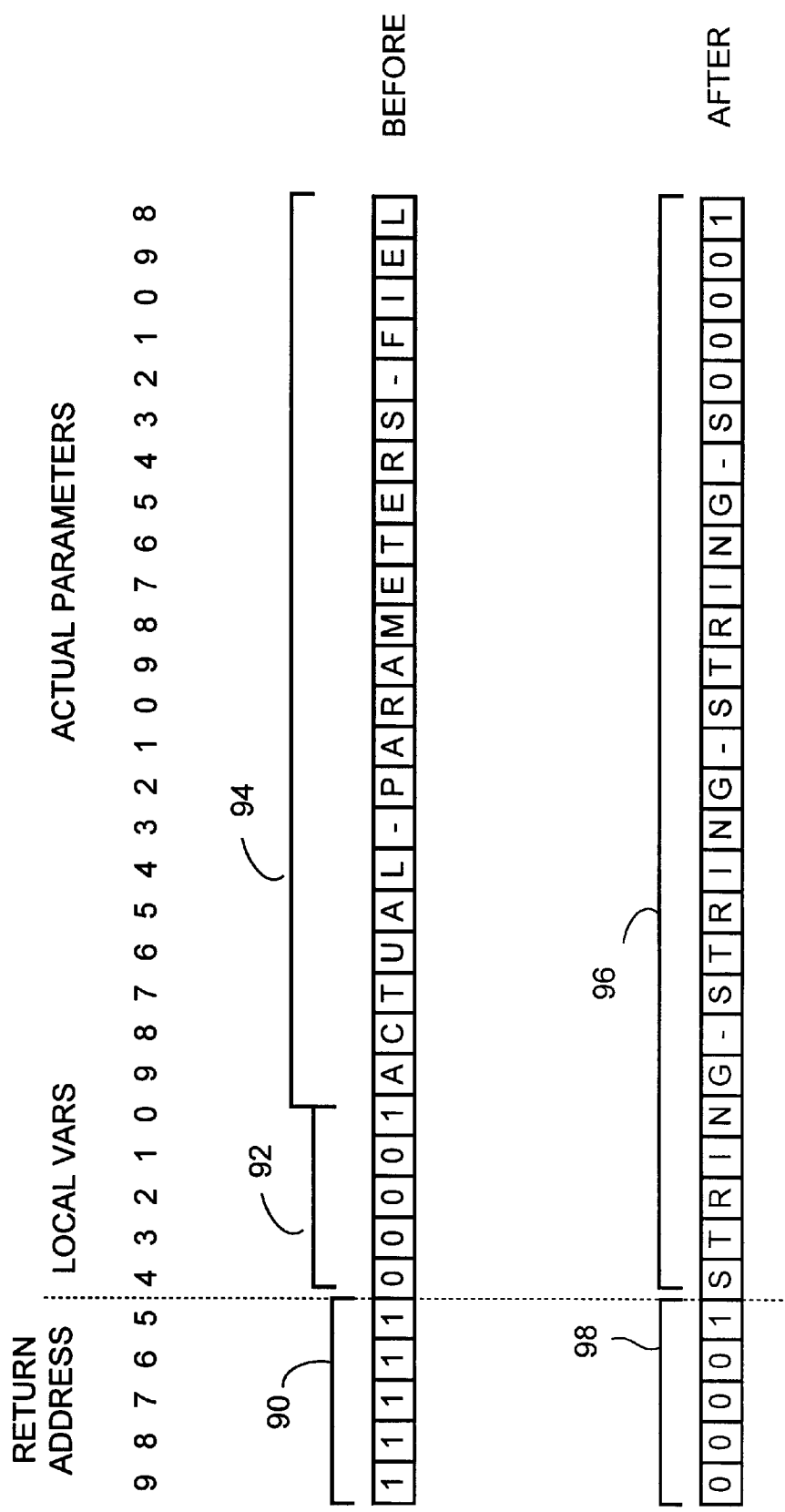
FIG. 4A is a schematic illustration in detail of parts of the stack segment array, in accordance with a preferred embodiment of the present invention.

Reference is now made to FIG. 4A, which is a schematic illustration in detail of parts of the stack segment array, operative in accordance with a preferred embodiment of the present invention.

The method according to the present invention is implemented in a stack segment array allocated to a function. When the function is executed, system 10 allocates a return address field within the stack segment memory location 90. System 10 further allocates local variables field 92 and actual parameters field 94. Conventionally, system 10 passes the function parameters to the actual parameters field 94 and initializes the local variables field 92. The return address field 90 is reserved for the address indicating the next computer program instruction to be executed.

A buffer overflow weakness is exploited when a function transfers a string to the actual parameters field 92 within the stack segment memory 96. Such string is larger then the actual parameters field 92 and the local variables field 94.

When the function transfers such a string to the stack segment memory 96, such string overwrites past the end of the stack segment memory 96. The string further replaces the return address 98 for the function with the starting address of the string passed into the stack segment memory 96. Thus, the indicated return address is altered.

When the execution of the function ends, system 10 transfers control to the computer program instruction indicated in the return address 98. In the present example, such a return address includes the address for the first instruction in the stack segment memory 96. System 10, then proceeds to execute the computer program instructions within the stack segment memory 95, thus altering the flow of the computer program.

Figure 4B:
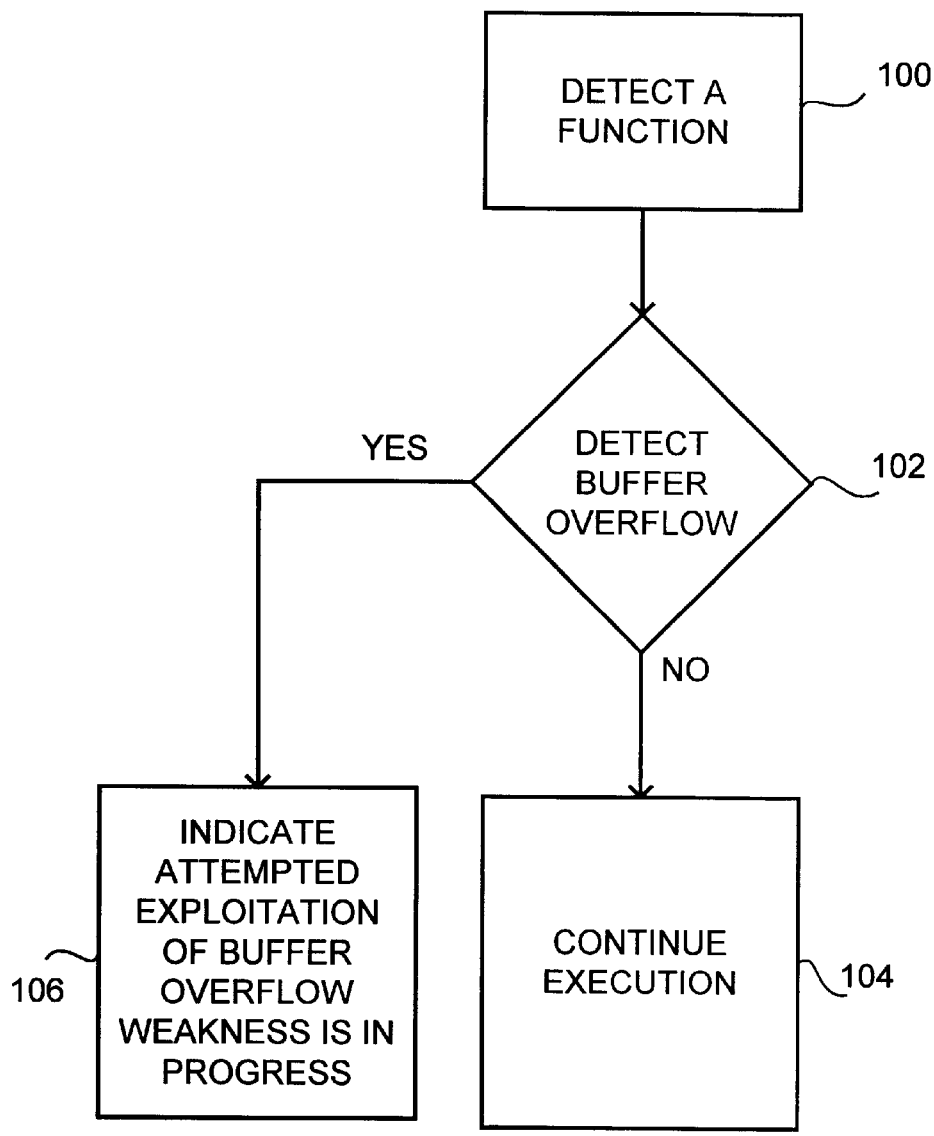
FIG. 4B is a schematic illustration of a method for detecting an attempt to exploit the buffer overflow weakness, operative in accordance with a preferred embodiment of the present invention.

Reference is now made to FIG. 4B, which is a schematic illustration of a method for detecting an attempt to exploit the buffer overflow weakness, operative in accordance with a preferred embodiment of the present invention.

Figure 1:
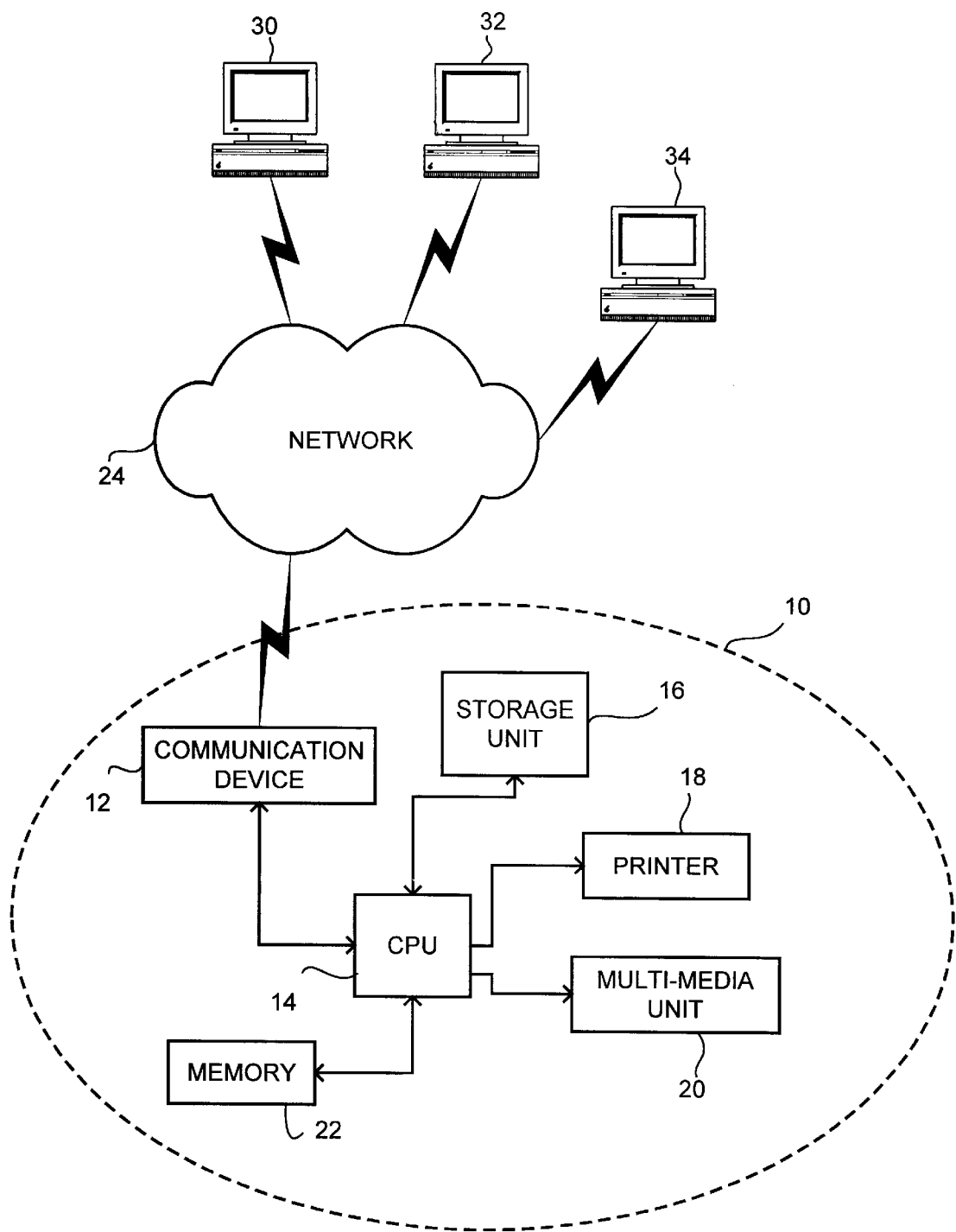
FIG. 1 is a schematic illustration of a computer system and a plurality of user stations, connected thereto, known in the art.
Figure 2A:
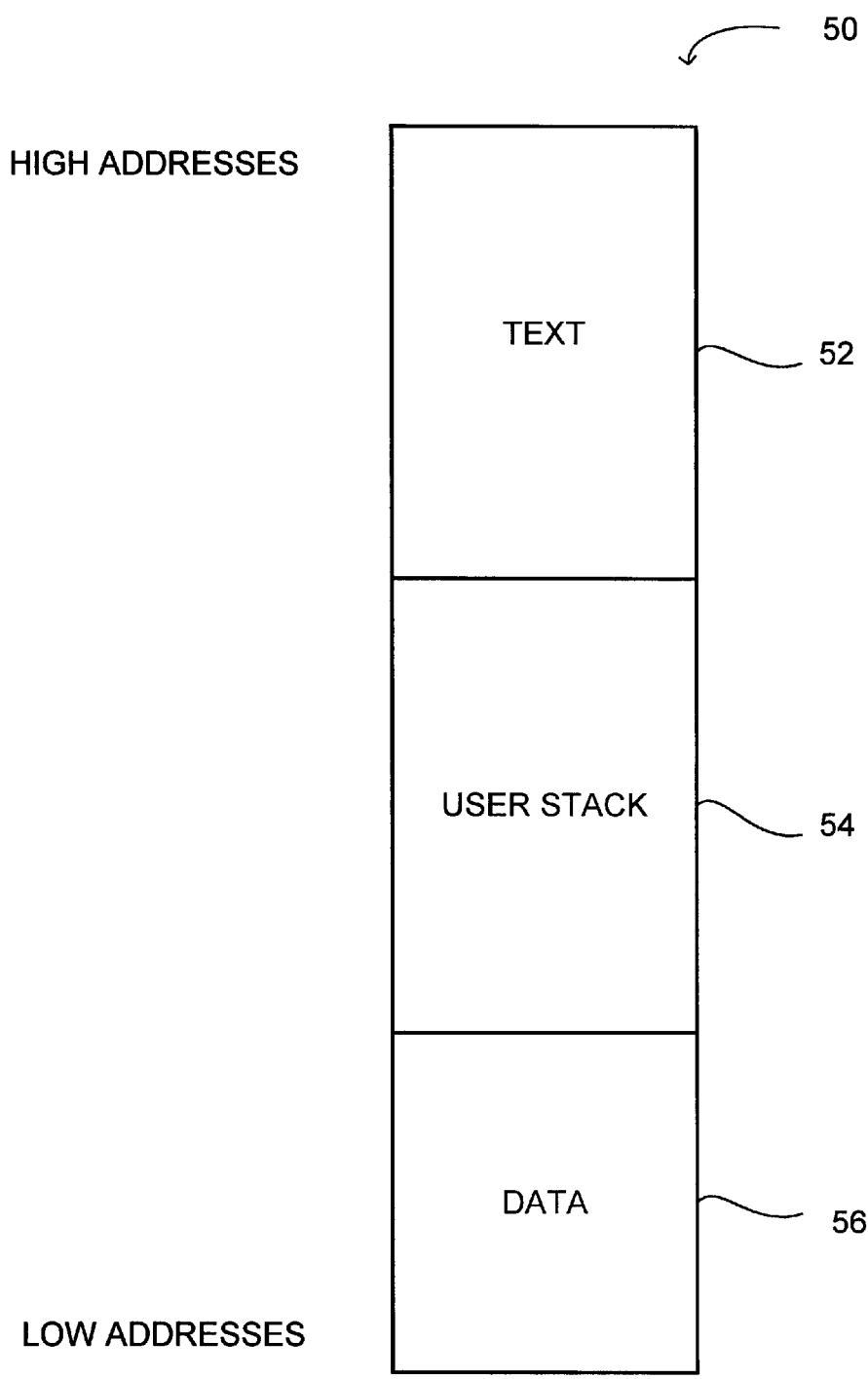
FIG. 2A is a schematic illustration of an array of user address space locations, known in the art.
Figure 2B:
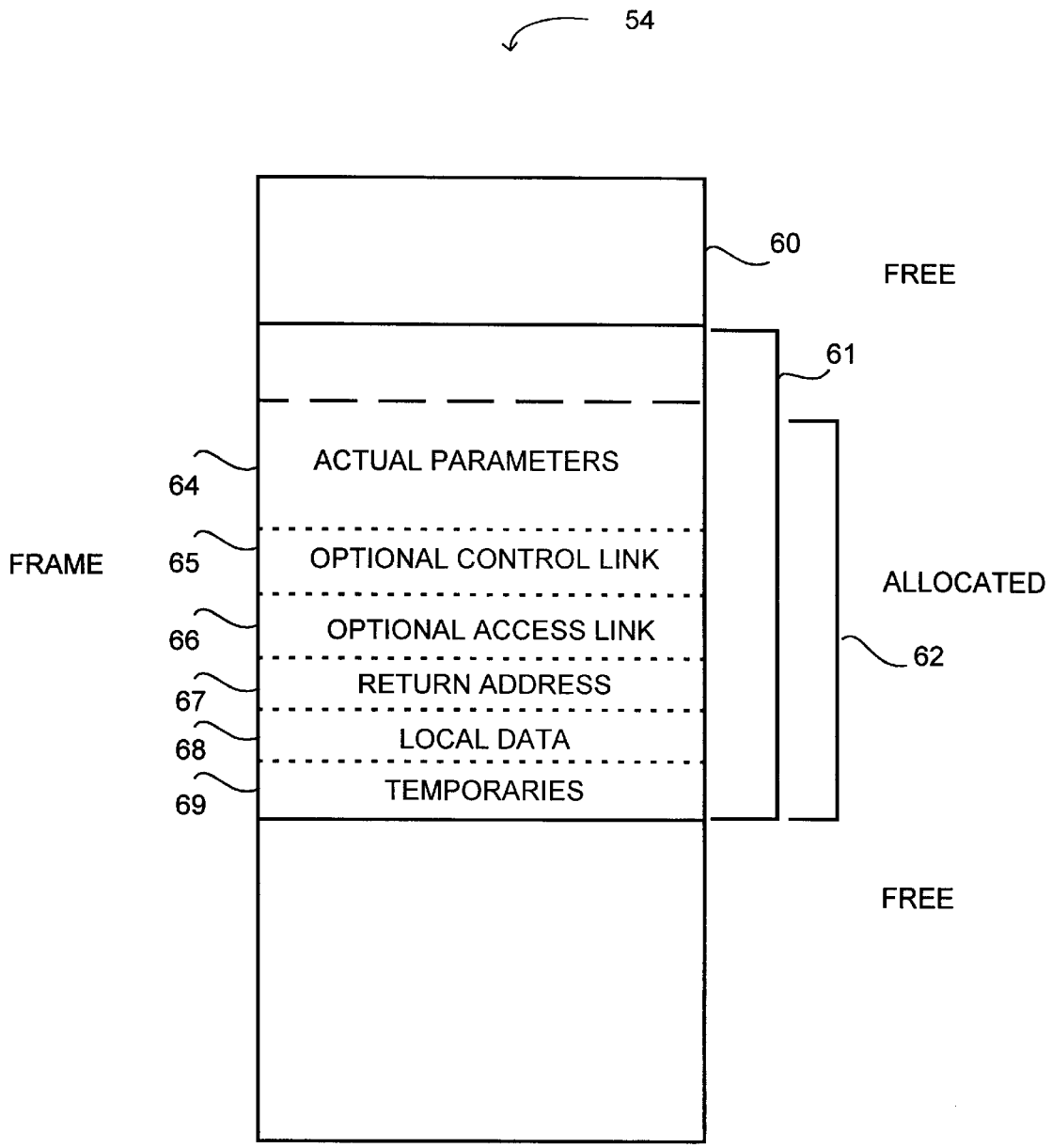
FIG. 2B is a schematic illustration in detail of the stack segment array 54 of the array of user address space in FIG. 2A, known in the art.
Figure 3:
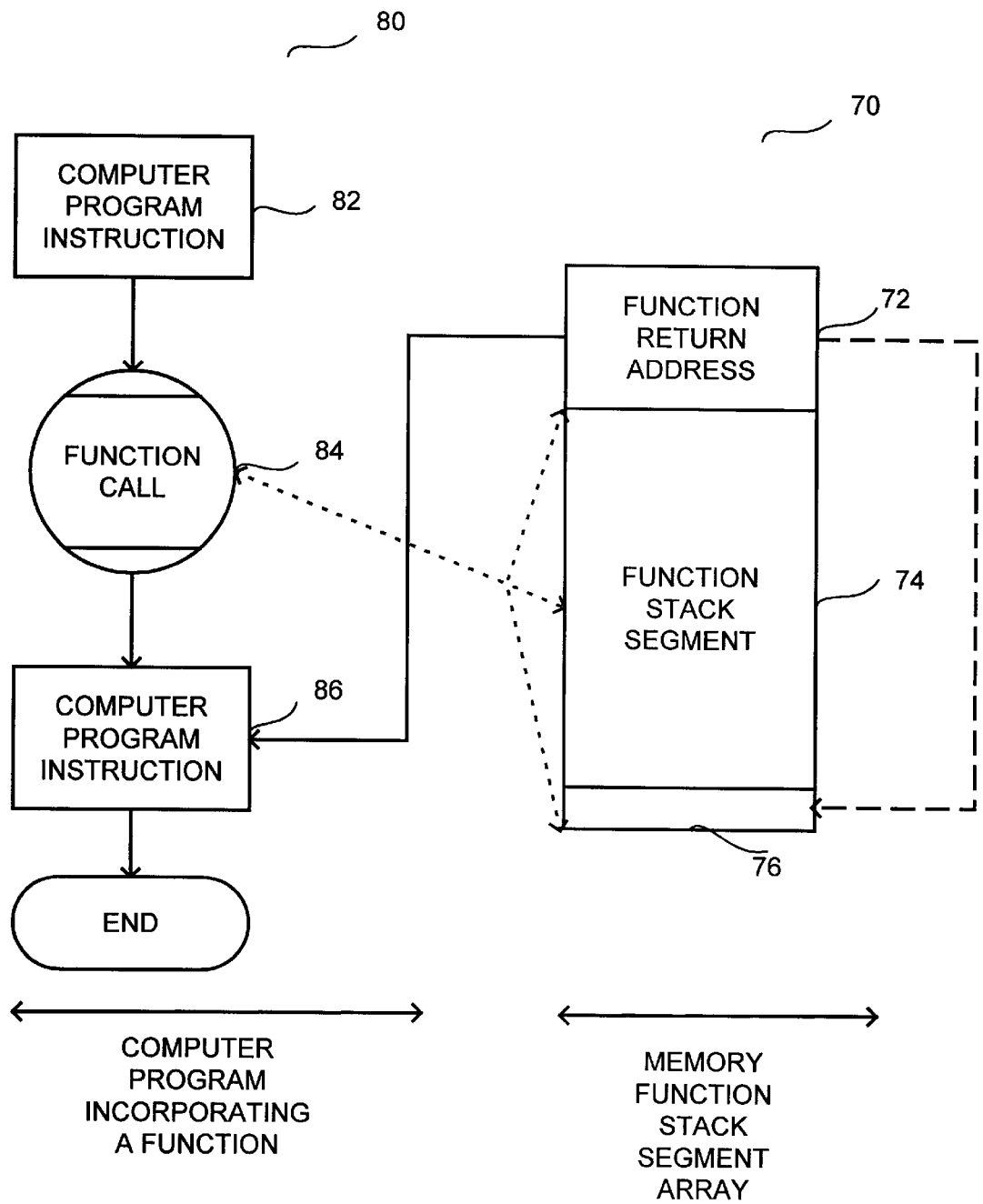
FIG. 3 is a schematic illustration of a function stack segment array and of a computer program, known in the art.

The method according to the present invention is implemented in a process, which preferably operates in parallel within systems like system 10 (FIG. 1).

In step 100, the system 10 detects if a function is called. The system 10 intercepts the called function. Detecting and intercepting functions is known in the Art.

In step 102, the system 10 detects if the intercepted function attempts to exploit a buffer overflow weakness. If so, then the system 10 proceeds to step 106. Otherwise, the system 10 proceeds to step 104.

In step 106, the system 10 indicates that an attempt to exploit a buffer overflow weakness is in progress. Such indication can include an indication to the system 10 administrator, an indication to a predetermined user, and the like. For example, one such indication can include a visual indication to the user. According to another example, one such indication can include an audio indication to the user. According to a further example, one such indication can include sending a message to a predetermined user of system 10. According to a further embodiment of the present invention, the system 10 prevents the further execution of the computer program. Such prevention can include an indication that an attempt to exploit a buffer overflow weakness is in progress.

In step 104, the system 10 proceeds with executing the function.

Figure 5:
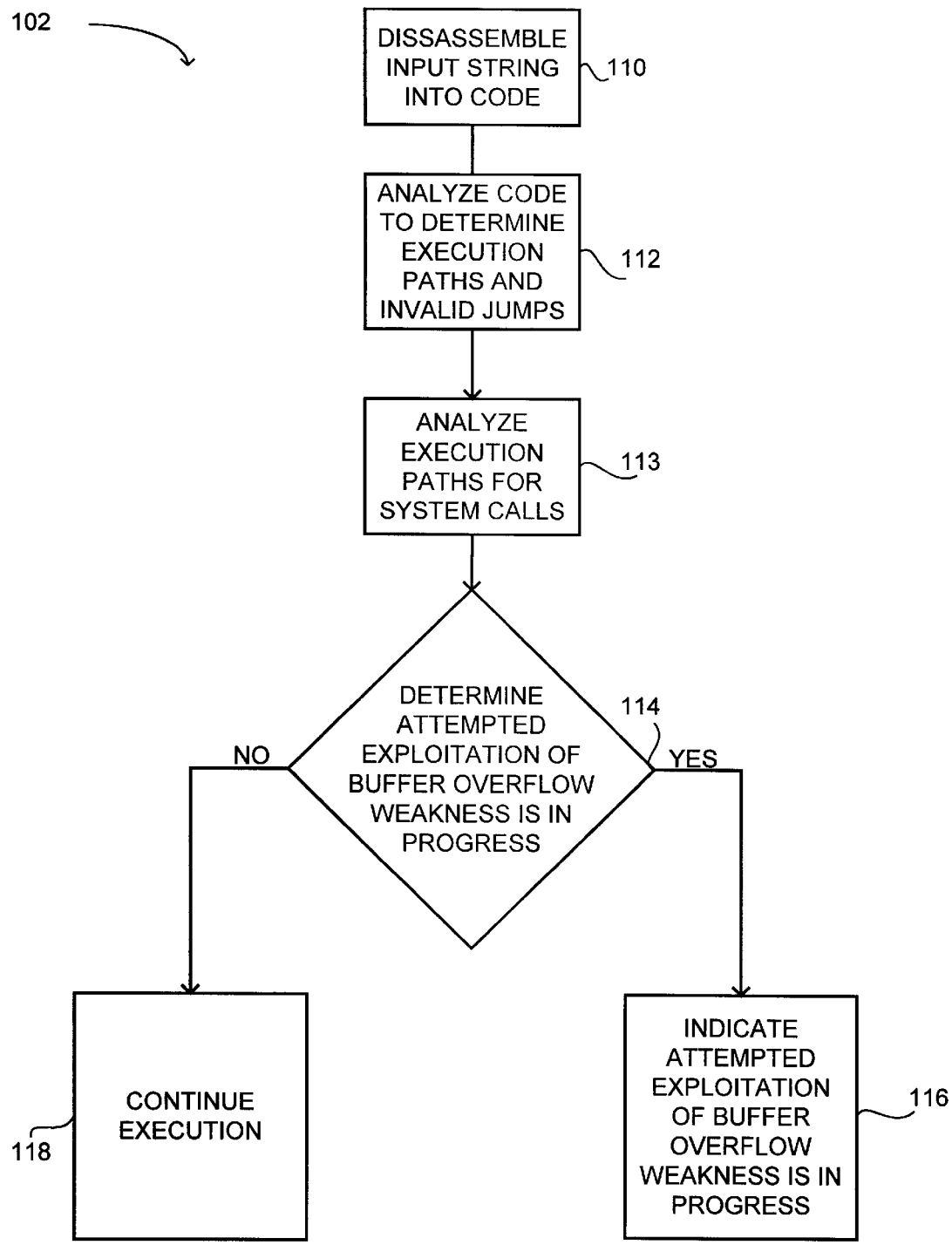
FIG. 5 is a schematic illustration in detail of step 102 of the method of FIG. 4B.

Reference is now made to FIG. 5, which is a schematic illustration in detail of step 102 of the method of FIG. 4B.

In step 110, the system 10 performs a code disassembly procedure on an input string. The input string includes data, which is received from the function interception (step 100). Such input string is the parameter transferred by the function to the stack segment. The code disassembly procedure can be performed according to a plurality of methods, which are known in the art.

It will be appreciated by those skilled in the art that disassembly of the input string may be achieved using any given number of disassembly methods. Disassembly of the input string produces an assembly language computer program.

In step 112 the system 10 analyzes the computer program produced in step 110 to identify possible execution paths there within. The present invention provides a criterion for determining the possible execution paths of such a computer program. A disassembled computer program usually includes a plurality of execution paths, which are linked by a plurality of jump instructions there between. A jump instruction is an instruction providing that the next instruction to be executed is not the following instruction within the code sequence.

According to one aspect of the invention, the disassembled code is scanned so as to determine which of the targets of each jump instruction is indeed a valid target.

By analyzing this information and creating an execution path graph, the method of the present invention determines if the code is a valid computer program. An execution path graph records the possible execution paths according to valid jump instructions and corresponding target instructions.

According to another aspect of the invention, the disassembled code is scanned so as to determine which of the jump instructions is invalid. A jump instruction, which is invalid, is a jump instruction not ending with an existing valid target instruction.

Next, in step 113 the system 10 analyzes the possible execution paths found, to detect if the possible execution paths contain a system call. Such computer program containing a system call indicates a probability of an attempted exploitation of the buffer overflow weakness, so as to obtain super user privileges.

Next, in step 114 the system 10 determines if an attempted exploitation of buffer overflow weakness is in progress. The present invention provides a buffer overflow score for determining whether an attempt to exploit the buffer overflow weakness is in progress.

In accordance with one aspect of the present invention, such a score is determined relative to the number of invalid jumps detected in step 112. For example, one such score can include the indication that the execution path includes an invalid jump target instruction.

In accordance with another aspect of the present invention, such score is determined if a system call is detected along one of the possible execution paths. For example, one such score can include the indication that a system call was detected on a possible execution path.

In accordance with a further aspect of the present invention, system 10 administrator predetermines the score pointing out that an attempted exploitation of buffer overflow weakness is in progress. For example, one such score can include the combined indication that a system call and a valid jump was detected along a possible execution path of the computer program.

If so, then the system 10 proceeds to step 116. Otherwise, the system 10 proceeds to step 118.

In step 116 the system 10 indicates that an attempt to exploit a buffer overflow weakness is in progress.

In step 118 the system 10 continues the execution of the system call.

Figure 6:
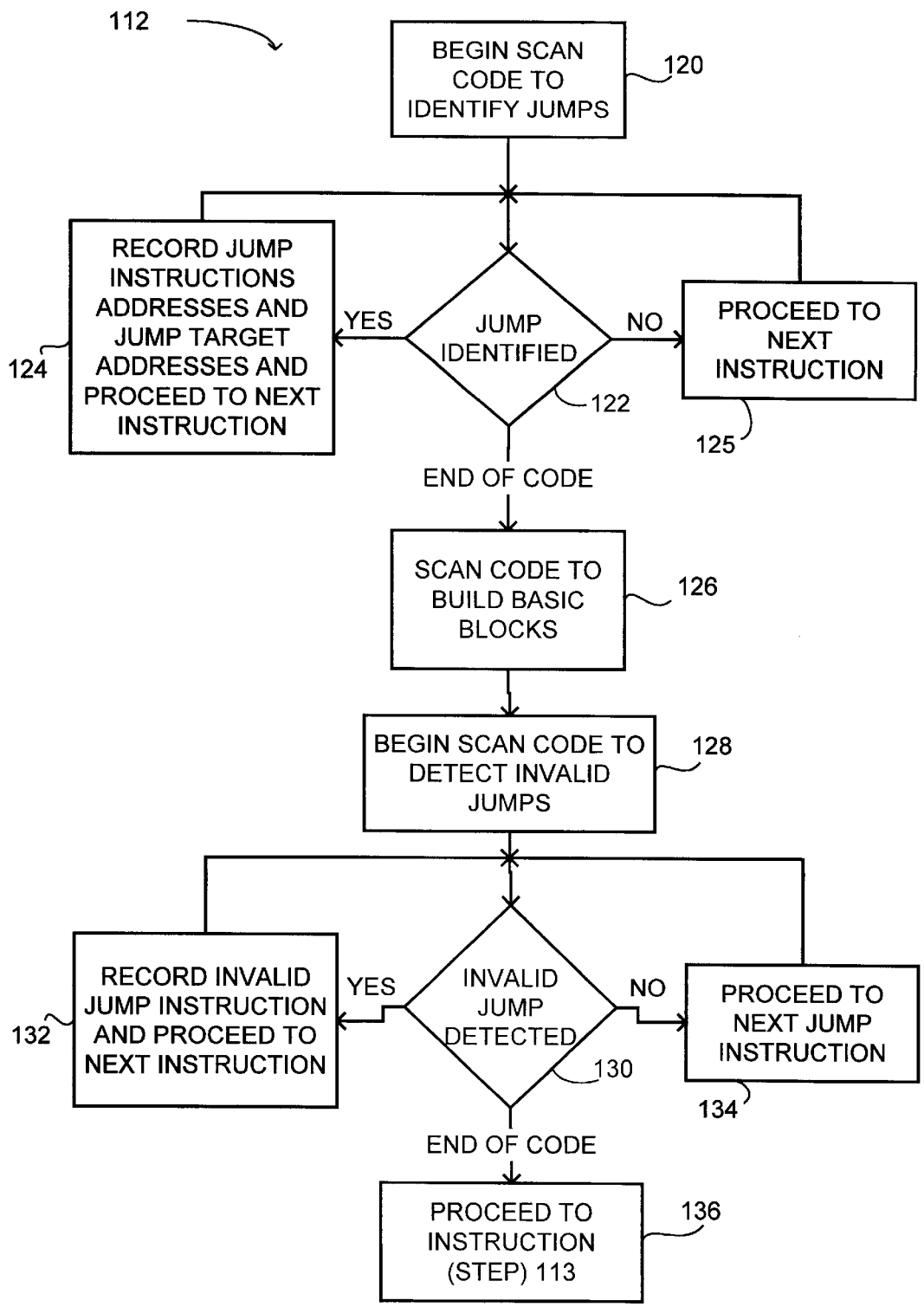
FIG. 6 is a schematic illustration in detail of step 112 of FIG. 5.

Reference is now made to FIG. 6, which is a schematic illustration in detail of step 112 of FIG. 5.

In step 120, the system 10 begins scanning the computer program so as to detect jump instructions. Such jump instructions are able to alter the flow control of the program.

In step 122, the system 10 detects if the examined instruction of the computer program includes a jump instruction. If so, then the system 10 proceeds to step 124. Otherwise, the system 10 proceeds to the next instruction (step 125) and continues to scan the computer program. When the end of the computer program is reached, the system 10 proceeds to step 126.

In step 124, the system 10 records the detected jump instruction. Such a jump instruction is recorded together with an associated address.

This address indicates a new target for the flow control of the process executed by system 10. According to this aspect of the invention, a specific array is created. The jump instructions and the respective jump target addresses are recorded in this array. This array is stored within a storage device of system 10. Such storage device may include a memory device or a hard device, such as a hard disk and the like. In the present example, this array is stored in memory unit 22 and is explained in further detail here in below, in conjunction with FIG. 9.

In step 126, the system 10 scans the computer program to detect structure characteristics such as jump instructions and targets of jumps thus detecting the computer program basic blocks. Such basic blocks include a group of computer program instructions executed in a sequential order. In accordance with one aspect of the present invention, the first instruction within any given basic block can include a target instruction. In accordance with another aspect of the present invention, the last instruction within any given basic block can include a jump instruction. In accordance with one aspect of the present invention, instructions within a basic block, but not the first or the last instruction within any given basic block, do not include a jump instruction or a target of a jump instruction. Step 126 is explained in further detail here in below, in conjunction with FIG. 7.

In step 128, the system 10 begins scanning the computer program to identify invalid jump instructions. Such scan detects whether each jump target address is associated with a valid jump instruction, from the ones recorded in the above step 124.

In step 130, the system 10 detects if the examined jump is invalid. If so, then the system 10 proceeds to step 132. Otherwise, the system 10 proceeds to the next jump instruction (step 134) and continues to scan the computer program. When the end of the computer program is reached, the system 10 proceeds to step 136.

In step 132, the system 10 records a detected invalid jump instruction. According to this aspect of the invention, the number of invalid jumps detected is stored within a storage device of system 10. Such storage device may include a memory device or a hard device, such a hard disk and the like. In the present example, this array is stored in memory unit 22.

In step 136, the system 10 proceeds to step 113 of FIG. 5.

Figure 7:
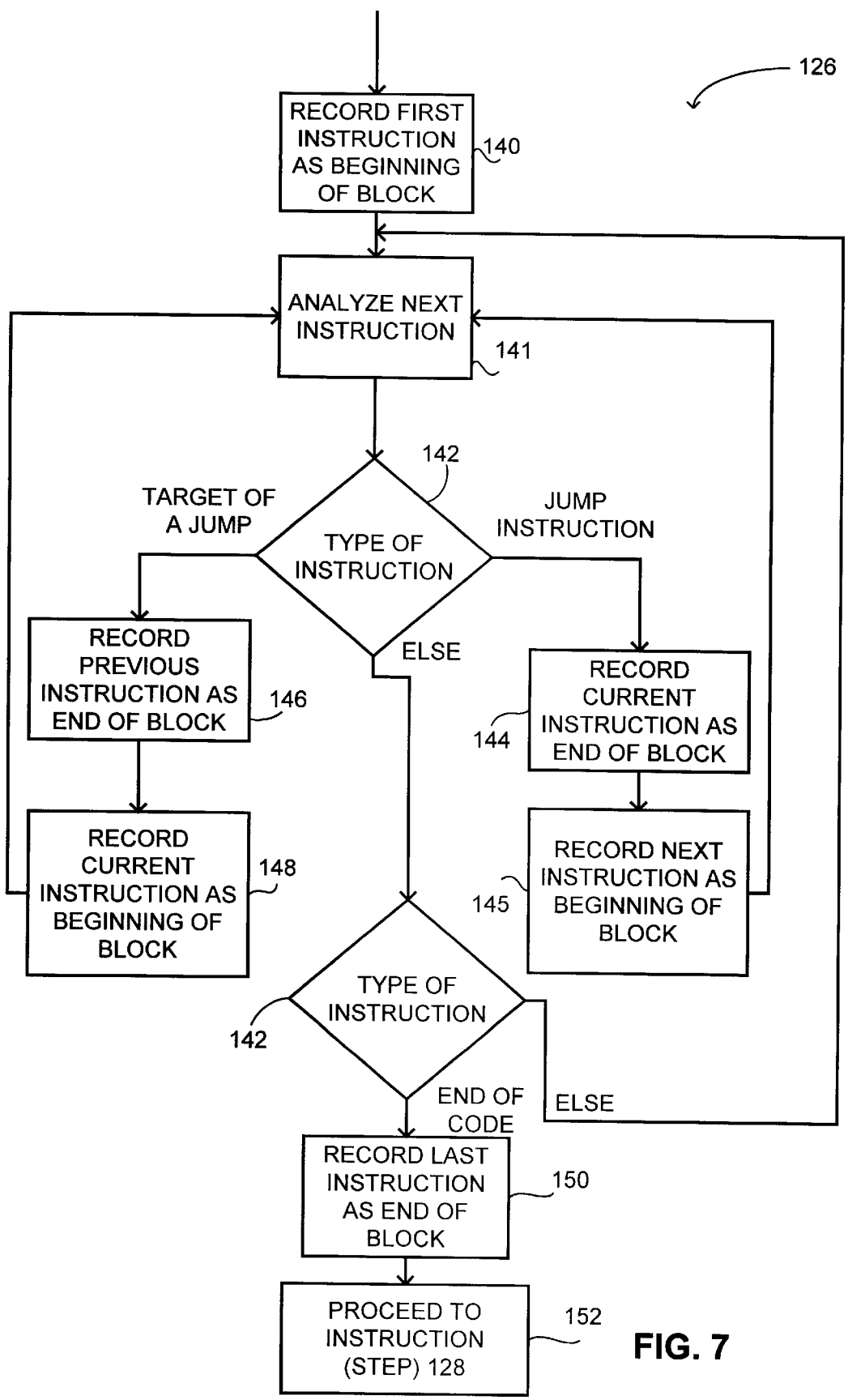
FIG. 7 is a schematic illustration in detail of step 126 of FIG. 6.

Reference is now made to FIG. 7, which is a schematic illustration in detail of step 126 of FIG. 6. In step 140, the system 10 begins to scan the computer program by recording the first instruction of the code as the beginning of the first basic block. In step 141, the system 10 analyzes the next instruction in the computer program. In step 142, the system 10 determines if the analyzed instruction is either a target of a jump, a jump instruction or the end of the code.

If the analyzed instruction is a jump instruction then the system 10 proceeds to step 144. If the analyzed instruction is a target jump instruction, then the system 10 proceeds to step 146. If the analyzed instruction is neither a jump instruction nor a target of a jump instruction, then the system 10 proceeds to analyze the next instruction (step 141). Finally, if the analyzed instruction indicates the end of the code then the system 10 proceeds to step 150.

In step 144 the system 10 records the current instruction examined as the end of a block of the current basic block. Such an end of basic block indicates the end of a sequence of instructions.

In step 145 the system 10 records that the next instruction denotes a beginning of a new basic block. Such an instruction is recorded as the beginning of a basic block so as to indicate that it is first instruction from a group of instructions. If such an instruction is not a target of a jump, the next instruction will not be executed when the computer program is executed.

In step 146 the system 10 records the previous analyzed instruction as the end of the current basic block.

In step 148 the system 10 records that the analyzed instruction denotes a beginning of a new basic block. Such an instruction is recorded as the beginning of a basic block so as to indicate that it is first instruction from a group of instruction to be performed one after the other.

It is noted that by doing so, the system 10 has recorded a graph presenting the start and end points of each of the basic blocks of instructions. It is also noted that by doing so, the system 10 has recorded the basic blocks, which are to be executed when the computer program is executed. According to the present invention, such a graph further assists in a more advanced analysis of the flow of the code.

Figure 8:
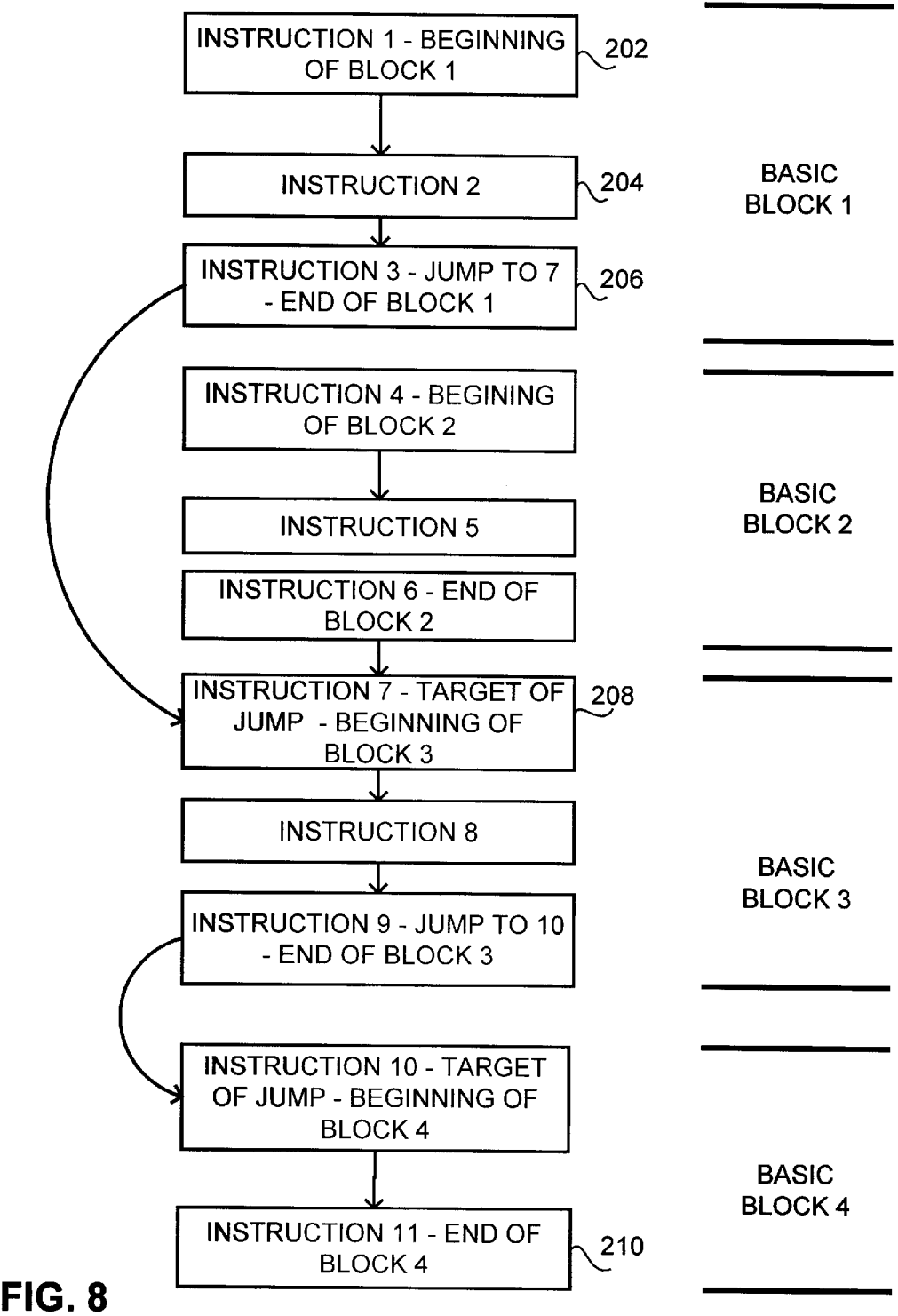
FIG. 8, is a schematic illustration in detail of a disassembled computer program demonstrating basic blocks construction according to the method described in FIGS. 6 and 7.

Reference is now made to FIG. 8, which is a schematic illustration in detail of a disassembled computer program demonstrating basic blocks construction according to the method described in FIGS. 6 and 7.

In command 202 the computer system 10 detects that instruction 1 is the first instruction in the computer program (step 140 of FIG. 7). System 10 proceeds to record this instruction as the beginning of basic block 1 (step 140 of FIG. 7). Next, system 10 proceeds to examine the next instruction (instruction 2).

In command 204, system 10 analyzes instruction 2 (step 141 of FIG. 7). Then, system 10 examines whether instruction 2 is a jump, a target of a jump or the end of code (step 141 of FIG. 7). The system 10 detects that it is neither and proceeds to analyze the next instruction (instruction 3) (step 141 of FIG. 7).

In command 206 the system 10 detects that the type of analyzed instruction is a jump instruction (step 142 of FIG. 7). System 10 proceeds to record instruction 3 as the end of basic block 1 (step 144 of FIG. 7). Then, system 10 proceeds to record the next instruction (instruction 4) as the beginning of block 2 (step 145 of FIG. 7).

It should be noted that computer system 10 continues to analyze instructions 4, 5 and 6 without detecting a jump, a target of a jump or the end of the code (steps 141 and 142 of FIG. 7).

In command 208 the system 10 analyzes instruction 7 (step 141 of FIG. 7). The system 10 detects that the type of instruction analyzed is a target of jump instruction (step 142 of FIG. 7). System 10 proceeds to record the previous analyzed instruction (instruction 6) as the end of basic block 2 (step 146 of FIG. 7). Next, system 10 proceeds to record the current instruction (instruction 7) as the beginning of block 3 (step 148 of FIG. 7).

In command 210 the computer system 10 detects that it has reached the end of the code (step 142 of FIG. 7).

System 10 will now proceed to record the last instruction (instruction 11) as the end of the last basic block (block 4) (step 150 of FIG. 7).

It will be appreciated by persons skilled in the art that the present invention is not limited to what has been particularly shown and described here in above. Rather the scope of the present invention is defined only by the claims, which follow.

What is claimed is:

1. Method for detecting buffer overflow weakness exploitation, comprising the steps of:
   determining at least one threshold parameter, each said at least one threshold parameter being respective to a buffer overflow weakness exploitation event,
   analyzing a code to be executed, thereby producing at least one validation value,
   comparing said at least one validation value to the respective ones of said at least one threshold parameters, and
   determining a buffer overflow weakness exploitation attempt, when at least one of said at least one validation value exceeds the respective one of said at least one threshold parameters.

2. The method according to claim 1, wherein said step of analyzing comprises the steps of:
   scanning said code thereby detecting jump instructions and target addresses,
   associating said jump instructions with said target addresses,
   determining jump instructions which are not associated with any of said target addresses as invalid jump instructions, and
   determining one of said at least one validation value as a function of the number of said invalid jump instructions.

3. The method according to claim 2, wherein said step of analyzing further comprises the steps of:
   sequentially analyzing the instructions of said code;
   determining the first instruction of said code as the beginning of a first block;
   determining each detected jump instruction as an end of a block;
   determining an instruction which follows each said detected jump instructions as a beginning of a block;
   determining the jump address of each said detected jump instructions as a beginning of a block;
   determining an instruction which precedes each said detected jump target address as an end of a block;
   determining the last instruction of said code as the end of a last block;
   detecting a system call instruction between each said beginning of a block and the first following end of a block; and
   determining one of said at least one validation value as a function of the number of detected system call instructions and the number of said beginnings of a block.

4. The method according to claim 1, wherein said step of analyzing comprises the steps of:
   sequentially analyzing the instructions of said code;
   determining the first instruction of said code as the beginning of a first block;
   determining each detected jump instruction as an end of a block;
   determining an instruction which follows each said detected jump instructions as a beginning of a block;
   determining the jump address of each said detected jump instructions as a beginning of a block;
   determining an instruction which precedes each said detected jump target as an end of a block;
   determining the last instruction of said code as the end of a last block;
   detecting a system call instruction between each said beginning of a block and the first following end of a block; and
   determining one of said at least one validation value as a function of the number of detected system call instructions and the number of said beginnings of a block.

5. The method according to claim 4, wherein said step of analyzing further comprises the steps of:
   scanning said code thereby detecting jump instructions and target addresses,
   associating said jump instructions with said target addresses,
   determining jump instructions which are not associated with any of said target addresses as invalid jump instructions, and
   determining one of said at least one validation value as a function of the number of said invalid jump instructions.

6. The method according to claim 1, further comprising the step of producing an alert when determining said buffer overflow weakness exploitation attempt.

7. The method according to claim 1, wherein said step of analyzing comprises analyzing a code to be passed to a parameter as a function.

* * * * *